(12) United States Patent
Grechka et al.

(10) Patent No.: US 7,508,735 B2
(45) Date of Patent: Mar. 24, 2009

(54) METHOD OF ANALYZING VERTICAL SEISMIC PROFILE DATA, METHOD OF PRODUCING A HYDROCARBON FLUID, AND A COMPUTER READABLE MEDIUM

(75) Inventors: Vladimir Grechka, Missouri City, TX (US); Albena Alexandrova Mateeva, Houston, TX (US)

(73) Assignee: Shell Oil Company, Houston, TX (US)

( * ) Notice: Subject to any disclaimer, the term of this patent is extended or adjusted under 35 U.S.C. 154(b) by 22 days.

(21) Appl. No.: 11/614,564

(22) Filed: Dec. 21, 2006

(65) Prior Publication Data

US 2007/0115755 A1 May 24, 2007

Related U.S. Application Data

(60) Provisional application No. 60/826,501, filed on Sep. 21, 2006.

(51) Int. Cl.
*G01V 1/30* (2006.01)

(52) U.S. Cl. .............. 367/57; 367/75; 367/38; 702/14

(58) Field of Classification Search .......... 367/57, 367/38, 75; 702/18, 14, 17
See application file for complete search history.

(56) References Cited

U.S. PATENT DOCUMENTS

| | | | | |
|---|---|---|---|---|
| 4,794,572 A | * | 12/1988 | Sondergeld et al. | 367/31 |
| 5,214,613 A | * | 5/1993 | Esmersoy | 367/31 |
| 5,808,963 A | * | 9/1998 | Esmersoy | 367/31 |
| 5,835,452 A | * | 11/1998 | Mueller et al. | 367/75 |
| 6,714,873 B2 | * | 3/2004 | Bakulin et al. | 702/14 |
| 6,748,330 B2 | * | 6/2004 | Leaney | 702/14 |
| 6,772,067 B2 | * | 8/2004 | Blanch et al. | 702/14 |
| 6,791,899 B2 | * | 9/2004 | Blanch et al. | 367/38 |
| 6,904,368 B2 | * | 6/2005 | Reshef et al. | 702/17 |
| 2003/0114989 A1 | * | 6/2003 | Blanch et al. | 702/14 |
| 2007/0195643 A1 | * | 8/2007 | Bakulin et al. | 367/38 |

OTHER PUBLICATIONS

Zhou et al. Anistorpy Evaluations Using an Array Walkaway VSP. OTC18177. May 1-4, 2006. 1 page.*
Urosevic, M. Information from Walk-Away VSP and Cross-Hole Data Using Various Wave Modes: Tower Cilliery, South Sydney Basin. Seismic Methods in Mineral Exploration. Paper 58. 1997. pp. 461-466.*
Grechka et al. Estimation of Seismic Anisotropy from P-wave VSP data. The Leading Edge. Jun. 2007. pp. 756-759.*
Grechka et al. Inversion of P-wave VSP data for local anisotropy: Theory and Caŝe Study. Geophysics. vol. 72. No. 4 (Jul.-Aug. 2007). D69-D79.*

(Continued)

*Primary Examiner*—Ian J Lobo

(57) ABSTRACT

A P-wave slowness-polarization data set resolving P-wave slowness against P-wave polarization angle is extracted from a multi-offset vertical seismic profiling data set. A function relating P-wave polarization angle to P-wave slowness, and being dependent on at least three free parameters, wherein in at least two of these free parameters information of shear wave velocity is absorbed together with one or more anisotropy parameters that characterize formation anisotropy is selected, and regression values found for the at least three free parameters by fitting the selected function to the P-wave slowness-polarization data set. The regression values may be utilized in a method of producing a mineral hydrocarbon fluid from an earth formation.

18 Claims, 2 Drawing Sheets

OTHER PUBLICATIONS

Mueller, Michael. Using Shear Waves to Predit lateral Variability in Vertical Fracture Intensity. Geophysics: The Leading Edge of Exploration. Feb. 1992. pp. 29-35.*

Tariq Alkhalifah et al., "Velocity Analysis for Transversely Isotropic Media". Geophysics, vol. 60, No. 5, pp. 1550-1566.

George E. Backus, "Possible Forms of Seismic Anisotropy of the Uppermost Mantle under Oceans", Journal of Geophysical Research, vol. 70, No. 14, pp. 3429-3439.

Audrey Bakulin. "Virtual Shear Checkshot with Airguns". pp. 3437-3440.

J. de Parscau, "P- and SV-wave Transversely Isotropic Phase Velocities Analysis from VSP data". Geophysical Journal International. 1991, 107, 629-638.

Pawan Dewangan. "Inversion of Multicomponent, Multiazimuth Walkaway VSP Data for the Stiffness Tensor". Geophysics, vol. 68, No. 3, pp. 1022-1031.

Veronique Farra. "High-Order Perturbations of the Phase Velocity and Polarization of $qP$ and $qS$ Waves in Anisotropic Media", Geophysical Journal International, pp. 93-104.

J. E. Gaiser. Transversely Isotropic Phase Velocity Analysis From Slowness Estimates, Journal of Geophysical Research, vol. 95, pp. 11.241-11.254.

Vladimir Grechka and Ilya Tscankin, "3-D Movement Velocity Analysis and Parameter Estimation for Orthorhombic Media". Geophysics. vol. 64, pp. 820-837.

Ellen Gomes et al., "Local Determination of Weak Anisotropy Parameters from Walkway VSP qP-wave data in the Java Sea Region", pp. 53-71.

Steve Horne and Scott Leaney, "Short note: Polarization and Slownbess Component Inversion for TI Anisotropy", Geophysical Prospecting, pp. 779-788.

Kai Hsu et al., "Anisotropy from Polarization and Movement", Schlumberger-Doll Research, pp. 1526-1529.

Petr Jilek et al., "Inversion of 3D VSP P-wave Data for Local Anisotropy: A Case Study", pp. 1322-1325.

Albena Mateeva, "Accurate Estimation of Subsalt Velocities Using Virtual Checkshots", OTC, pp. 1-5.

Douglas E. Miller and Carl Spencer, "An Exact Inversion for anisotropic Moduli From Phase Slowness Data", Journal of Geophysical Research, vol. 99, pp. 21.651-21.657. Nov. 10, 1994.

Ivan Psencik and Dirk Gajewski, "Polarization, Phase Velocity, and NMO Velocity of qP-Waves in Arbitrary Weakly Anisotropic Media", Geophysics, vol. 63, pp. 1754-1766.

Ivan Psencik and Veronique Farra. "First-Order Ray Tracing for qP Waves in Inhomogeneous Weakly Anisotropic Media", Geophysics, pp. D65-D75.

Leon Thomsen. "Weak Elastic Anisotropy", Geophysics. pp. 1954-1966.

Ilya Tsvankin, "Anisotropic Parameters and P-wave Velocity for Orthorhombic Media", Geophysics, vol. 62, pp. 1292-1309.

J. E. White, "Measured Anisotropy in Pierre Shale", Geophysical Prospecting, pp. 709-725.

Paul Williamson and Eric Maocec, Estimation of Local Anisotropy Using Polarisations and Travel Times from the Oseberg 3DVSP.

Xuyao Zheng and Ivan Psencik, "Local Determination of Weak Anisotropy Parameters from qP-wave Slowness and Particle Motion Measurements", Pure and Applied Geophysics, pp. 1881-1905.

* cited by examiner

METHOD OF ANALYZING VERTICAL SEISMIC PROFILE DATA, METHOD OF PRODUCING A HYDROCARBON FLUID, AND A COMPUTER READABLE MEDIUM

CROSS REFERENCE TO EARLIER APPLICATION

The present application claims priority benefits of U.S. provisional application 60/826,501 filed 21 Sep. 2006.

FIELD OF THE INVENTION

The present invention relates to a method of analyzing vertical seismic profile data, and to a method of producing a mineral hydrocarbon containing fluid from an earth formation.

DESCRIPTION OF RELATED ART

In an article published in 2000 by the Society of Exploration Geophysicists in the Proceedings of the 9th International Workshop on Seismic Anisotropy (9IWSA), pages 339-348, entitled "Estimation of local anisotropy using polarizations and travel times from the Oseberg 3D VSP", Williamson and Maocec apply polarization inversion to direct P-wave arrivals from a 3D vertical seismic profiling (VSP) data set in a multi-offset VSP experiment to yield the anisotropic seismic velocity in the vicinity of a receiver array located in a well in the earth. The receiver array consisted of five elements, each comprised of three perpendicular geophones of which one was oriented along the well. For each shot used to build the 3D VSP, the slowness along the well was obtained by a linear regression of the travel times over the five receiver elements.

Carrying out the inversion required information on seismic velocity. In order to execute the polarization inversion, Williamson and Maocec decided to simply fix the ratio $V_{S0}/V_{P0}=0.5$, whereby $V_{S0}$ corresponds to the vertical shear wave (S-wave) velocity and $V_{P0}$ corresponds to the vertical pressure wave (P-wave) velocity.

While the value of 0.5 for the ratio $V_{S0}/V_{P0}$ may be realistic, Williamson and Maocec note that an error in the ratio would generate a similar proportional error in the anisotropy parameters used for fitting the polarizations.

Embodiments of the present invention seek to eliminate that drawback.

BRIEF SUMMARY OF THE INVENTION

The invention provides a method of analyzing a vertical seismic profile, comprising:
  obtaining a multi-offset vertical seismic profiling data set comprising a representation of a wave-field recorded by an array of multi-component seismic receivers;
  extracting a P-wave slowness-polarization data set from the multi-offset vertical seismic profiling data set, the P-wave slowness-polarization data set resolving P-wave slowness against P-wave polarization angle relative to a reference direction;
  selecting a function relating P-wave polarization angle to P-wave slowness, the selected function being dependent on at least three free parameters, wherein in at least two of these free parameters information of shear wave velocity is absorbed together with one or more anisotropy parameters descriptive of formation anisotropy;
  finding regression values for the at least three free parameters by fitting the selected function to the P-wave slowness-polarization data set.

By absorbing information of shear wave velocity in some of the free parameters together with one or more anisotropy parameters that characterize formation anisotropy, no information on shear wave velocity needs be provided to find values for the regression parameters. In other words, the inversion becomes independent of the shear wave velocity. Hence, the inversion provides more robust and accurate regression values than before.

The regression values of the free parameters may be utilized in their own right. In one embodiment, for instance, they are shown to correlate with lithology. The regression values of the free parameters may also be utilized for calculating values for the one or more anisotropy parameters, by inserting the information of shear wave velocity.

The invention also provides a computer readable medium storing computer-executable instructions performing at least the following steps:
  receiving a multi-offset vertical seismic profiling data set comprising a representation of a wave-field recorded by an array of multi-component seismic receivers;
  extracting a P-wave slowness-polarization data set from the multi-offset vertical seismic profiling data set, the P-wave slowness-polarization data set resolving P-wave slowness against P-wave polarization angle relative to a reference direction;
  finding regression values for the at least three free parameters by fitting a selected function to the P-wave slowness-polarization data set, the selected function relating P-wave polarization angle to P-wave slowness and being dependent on at least three free parameters, wherein in at least two of these free parameters information of shear wave velocity is absorbed together with one or more anisotropy parameters descriptive of formation anisotropy.

The method and/or the computer readable medium may be utilized in a method of producing a mineral hydrocarbon fluid from an earth formation, wherein the regression values that have resulted from analyzing the vertical seismic profile in accordance with the above may be correlated with the presence and/or nature of a mineral hydrocarbon containing fluid reservoir. The method may further comprise drilling a wellbore to and into the reservoir and/or producing the mineral hydrocarbon containing fluid from the reservoir via a well that penetrates into the reservoir.

The invention will hereinafter be explained by way of example and with reference to the drawings.

DETAILED DESCRIPTION

One or more illustrative embodiments incorporating the invention disclosed herein are presented below.

The term "slowness" is conventionally employed as entity describing local travel time differences per distance between receivers located at different locations in the earth over the distance that the receivers are separated from each other. However, for the purpose of interpreting the present application, the term slowness is intended to cover also derived quantities, including for instance its inverse equivalent, local velocity.

The term "slowness-polarization data" as used herein is intended to mean data containing information that links slowness to wave polarization direction.

The present invention utilizes a multi-offset vertical seismic profiling data set. Such multi-offset VSP data set may be obtained by means of a so-called 2D walk-away method, optionally combined with a walk-around method, or a 3D method employing an areal array of multiple sources, etc.

Figure 1:
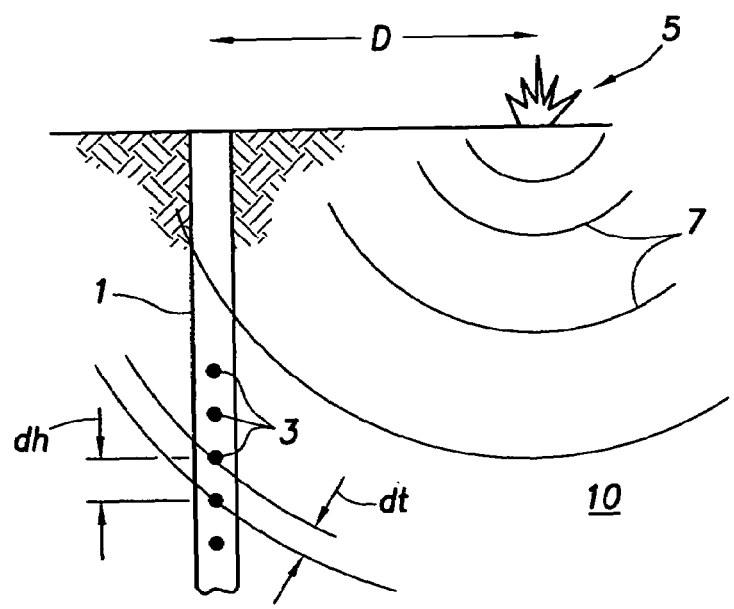
FIG. 1 illustrates VSP profiling in a schematic cross sectional view of an earth formation.

FIG. 1 shows a schematic cross section of an earth formation 10 intersected by a borehole 1. A reservoir 2 may be present in the earth formation 10. The borehole 1 may ultimately penetrate into the reservoir to form a well, or it may be preferred to create a new borehole to form the well.

In the present example, the borehole will be assumed to extend along a reference direction. FIG. 1 will be used to illustrate VSP profiling. An array comprising of a plurality of seismic receivers 3 is located in the borehole. Typically, such receivers are provided in the form of multi-component geophones such as orthogonal three-component geophones. Conveniently, one of the components is directed along the reference direction and/or along the borehole direction. In the present example it is assumed that the receivers 3 in the array are disposed in an equidistant relationship between neighboring receivers whereby neighboring receivers are each spaced dh apart. It will be understood that this is convenient, but the geophones do not have to be equidistant for VSP profiling.

A source has fired in location 5 with an offset D relative to the point where the borehole intersects the surface. The location 5 of source may be but does not have to be on the surface. The firing induces a traveling wave front 7, here schematically depicted at various times t after the firing. The local slowness q at a selected receiver is dt/dh, whereby dt represents the difference in P-wave arrival times, suitably of first arrivals, in the selected receiver and an adjacent receiver.

The wave fronts, at the locations of the receivers 3, in addition to their propagation velocity and their direction vector n, also have a polarization vector U, each of which may be characterized in the three-dimensional space relative to the reference direction along the borehole 1 by means of a polar angle $\psi$ (which will hereinafter be used to represent the angle between the polarization vector and the reference direction) and of an azimuthal angle $\phi$ (which will hereinafter be used to represent an azimuthal direction of the polarization vector around and the reference direction).

Both the slowness and the polarization direction U; are local quantities—on a scale on the order of a seismic wavelength—that don't depend on the velocity structure of the overburden.

One of the objects of this disclosure is to select a function relating P-wave polarization angle to P-wave slowness. To obtain such a function, Applicants contemplated the use of a first-order perturbation theory to derive the function for triclinic media as well as for higher symmetries.

A reference isotropic solid was selected of which the density-normalized elasticity may be described by a density-normalized stiffness tensor $c_{ijkl}$:

$$c_{ijkl}^{iso} = (V_p^2 - 2V_s^2)\delta_{ij}\delta_{kl} + V_s^2(\delta_{ik}\delta_{jl} + \delta_{il}\delta_{jk}), (i, j, k, l = 1, 2, 3),$$

wherein $V_p$ and $V_s$ are the P- and S-wave velocities and $\delta_{ij}$ represents the Kronecker delta. Anisotropy of the earth is characterized using anisotropic perturbations $\Delta c_{ijkl}$ from the isotropic stiffness tensor $c_{ijkl}$ of the earth formation, whereby it is assumed that the norm of $\Delta c_{ijkl}$ is much smaller than the norm of $c_{ijkl}$.

Ignoring higher order terms of $\Delta c_{ijkl}$, it can be shown that the slowness vector components $p_m$ (m=1, 2, 3) can be expressed in terms of components of the perturbed P-wave polarization vector U as follows:

$$p_m \simeq \frac{U_m}{V_p} - \left[\frac{U_m U_i}{2} + f(U_m^{(2)}U_i^{(2)} + U_m^{(3)}U_i^{(3)})\right]\frac{\Delta c_{ijkl}}{V_p^3}U_j U_k U_l, (m = 1, 2, 3),$$

wherein $f=1(1-(V_s/V_p)^2)$.

This equation was unexpectedly discovered by combining G. E. Backus' work as published in J. Geophysical Research Vol. 70 (1965) pages 3429-3439 under title "Possible form of seismic anisotropy of the uppermost mantle under oceans" with I. Pšenčík and D. Gajewski's work as published in Geophysics Vol. 63 (1998) under title "Polarization, phase velocity, and NMO velocity of qP-waves in arbitrary weakly anisotropic media", both herein incorporated by reference.

Taking m=3 as the direction along the reference to direction, $p_3$ is by definition the slowness q. The three components of polarization vector $U=[U_1, U_2, U_3]$, in terms of polar angle $\psi$ and azimuth angle $\phi$ component, also taking 3 as the direction along the reference direction, are: $U_1=\sin \psi \cos \phi$; $U_2=\sin \psi \sin \phi$; $U_3=\cos \psi$. These components may be inserted in the equation for suitably applying the equation to the VSP data set.

Fifteen combinations of 21 stiffness coefficients can be constrained by applying the equation to wide azimuth multi-offset VSP data, provided there is enough slowness-polarization data of sufficiently low noise to do so. The combinations (in Voigt notation) are:

$\Delta c_{11}$, $\Delta c_{12}+2\Delta c_{66}$, $\Delta c_{13}+2\Delta c_{55}$, $\Delta c_{14}+2\Delta c_{56}$, $\Delta c_{15}$, $\Delta c_{16}$, $\Delta c_{22}$, $\Delta c_{23}+2\Delta c_{44}$, $\Delta c_{24}$, $\Delta c_{25}+2\Delta c_{46}$, $\Delta c_{26}$, $\Delta c_{33}$, $\Delta c_{34}$, $\Delta c_{35}$, $\Delta c_{36}+2\Delta c_{45}$.

The equation also indicates that $V_p$ can be resolved along with these combinations, but that the value of f, which in itself cannot be inferred from the slowness-polarization data, is necessary to correctly constrain the values Of $\Delta c_{ijkl}$.

It is therefore presently proposed to define a new parameterization, which absorbs information of seismic velocity (e.g. in terms of f) together with one or more of the anisotropy parameters $\Delta c_{ijkl}$ that characterize formation anisotropy. Thus, the new function is defined in terms of natural parameters, which govern the anisotropic dependence of the P-wave slowness on polarization, rather than in parameters that are typically used for describing the anisotropy. When inverting on basis of the new function, regression values can more effectively be obtained without requiring a-priory knowledge of or an assumption of seismic velocities.

Generally, the stiffness perturbations may suitably be transferred to other parameter sets that more suitably map with certain features characterizing an anisotropy. Moreover, while selecting the function relating P-wave polarization angle to P-wave slowness, any suitable assumption on symmetry of the anisotropy in the earth formation may be made in order to reduce the number of free parameters and/or the data requirements. Each symmetry may give rise to a parameterization suitable for characterizing anisotropy under that symmetry.

For instance, an orthorhombic medium, whose symmetry plane $x_1$-$x_2$ is orthogonal to the reference direction, may be assumed. Instead of the stiffness perturbations $\Delta c_{ijkl}$, the anisotropy may more suitably be expressed in terms of five anisotropic coefficients $\delta^{(1)}$, $\delta^{(2)}$, $\eta^{(1)}$, $\eta^{(2)}$, and $\eta^{(3)}$, in accordance with I. Tsvankin "Anisotropic parameters and P-wave velocity for orthorhombic media", in Geophysics Vol. 62 (1997), pages 1292-1309 and/or V. Grechka and I. Tsvankin "3-D moveout velocity analysis and parameter estimation for orthorhombic media", in Geophysics Vol. 64 (1999), pages 820-837, both herein incorporated by reference.

In terms of these anisotropic coefficients, the components of the P-wave slowness, as a function of polarization angles $\psi$ and $\phi$, look like:

$$p_1 \simeq \frac{\sin\psi\cos\phi}{V_{p_0}}\{1 - f_0\delta^{(2)} + (f_0-1)(\delta^{(1)}\sin^2\phi + \delta^{(2)}\cos^2\phi)\sin^2\psi +$$
$$\eta^{(1)}\sin^2\psi\sin^2\phi[(f_0-1)\sin^2\psi - f_0\cos^2\psi] -$$
$$\eta^{(2)}\sin^2\psi[\sin^2\psi\cos^2\phi + f_0(2\cos^2\psi - \cos2\psi\sin^2\phi)] +$$
$$\eta^{(3)}\sin^2\psi\sin^2\phi[f_0\cos^2\psi + (\cos^2\phi - f_0\cos2\psi)\sin^2\psi]\}.$$

$$p_2 \simeq \frac{\sin\psi\sin\phi}{V_{p_0}}\{1 - f_0\delta^{(1)} + (f_0-1)(\delta^{(2)}\cos^2\phi + \delta^{(1)}\sin^2\phi)\sin^2\psi +$$
$$\eta^{(1)}\sin^2\psi[(2f_0-1)\sin^2\psi\sin^2\phi - f_0(1+\sin^2\phi)] +$$
$$\eta^{(2)}\sin^2\psi\cos^2\phi[(f_0-1)\sin^2\psi - f_0\cos^2\psi] +$$
$$\eta^{(3)}\sin^2\psi\cos^2\phi[f_0 - (2f_0-1)\sin^2\psi\sin^2\phi]\},$$

$$p_3 \simeq \frac{\cos\psi}{V_{p_0}}[1 + (f_0-1)(\delta^{(1)}\sin^2\phi + \delta^{(2)}\cos^2\phi)\sin^2\psi +$$
$$(2f_0-1)(\eta^{(1)}\sin^2\phi + \eta^{(2)}\cos^2\phi - \eta^{(3)}\sin^2\phi\cos^2\phi)\sin^4\psi],$$

wherein $f_0 = 1/(1-(V_{s0}/V_{p0})^2)$ is expressed in terms of the S- and P-wave seismic velocity in the reference direction m=3. In order to obtain data that can be inverted using this symmetry assumption, the azimutal orientation of each receiver should be known independently from the seismic data, e.g. by means of gyroscopic or self-orienting receivers or other determination.

As another example, vertical transverse isotropy may be assumed for vertical boreholes. This does not require VSP data under various azimuths, such that a relatively simple walk-away dataset may suffice. Only two parameters are required to suitably describe the anisotropy with such a symmetry. For instance, the Thomsen parameterization, on basis of $\delta$ and $\epsilon$, may be employed as introduced in "Weak elastic anisotropy" by L. Thomsen in Geophysics Vol. 51 (1986), pages 1954-1966, herein incorporated by reference. Another suitable parameterization, in terms of $\delta$ and $\eta$, has been found useful, as well. The coefficient $\eta$ corresponds to a anellipticity coefficient. These are tied to Tsvankin's orthorhombic parameters as $\delta = \delta^{(1)} = \delta^{(2)}$, and $\eta = \eta^{(1)} = \eta^{(2)}$. The transverse isotropy requires that $\eta^{(3)} = 0$. Inserting these in the equations above yields (for directions i=1, 2):

$$p_i \simeq \frac{U_i}{V_{p_0}}\{1 + \delta[(f_0-1)\sin^2\psi - f_0] + \eta\sin^2\psi[(2f_0-1)\sin^2\psi - 2f_0]\},$$

and for direction 3 (along the reference direction):

$$p_3 \simeq \frac{U_3}{V_{p_0}}[1 + \delta(f_0-1)\sin^2\psi + \eta(2f_0-1)\sin^4\psi]\bigg|.$$

Taking the last mentioned equation as example, a P-wave vertical slowness-polarization data set, representing $q(\psi) \equiv p_3$, may suitably be extracted from a 2D walkaway VSP data set comprising a representation of a full wave-field recorded by an array of multi-component geophones.

As a suitable function, relating P-wave polarization angle to P-wave slowness, may be selected:

$$p_3 \equiv q(\psi) \simeq \frac{\cos\psi}{V_{p_0}}(1 + \delta_{VSP}\sin^2\psi + \eta_{VSP}\sin^4\psi),$$

whereby, of the three free parameters $1/V_{p0}$, $\delta_{VSP}$, and $\eta_{VSP}$, $\delta_{VSP}$ relates to the Thomsen anisotropic parameter $\delta$ as $\delta_{VSP} = (f_0-1)\delta$, and $\eta_{VSP}$ relates to the Thomsen anisotropic parameter $\eta$ as $\eta_{VSP} = (2f_0-1)\eta$, whereby $f_0$ is defined as before $[f_0 = 1/(1-(V_{s0}/V_{p0})^2)]$. Thus, one of the three free parameters, $1/V_{p0}$, is independent of formation anisotropy and shear wave velocity information whereas information of shear wave velocity is absorbed together with formation anisotropy parameters in the other two free parameters $\delta_{VSP}$, and $\eta_{VSP}$.

The P-wave vertical slowness-polarization data set may thus be inverted without having to make an assumption or needing a-priory knowledge on vertical shear wave velocity, allowing an accurate finding of regression values for all three free parameters by fitting the selected function to the P-wave slowness-polarization data set.

The method may optionally be supplemented by subsequently calculating values for the one or more anisotropy parameters (e.g. $\delta$ and $\eta$, in the case of vertical transverse isotropic media) from the regression values. This may be achieved by inserting information of shear wave velocity as may be obtained from an a-priory determination from other measurements (such as sonic logs) or may be obtained from the VSP data set. One way of estimating a value for the S-wave vertical velocity is by applying the so-called virtual checkshot method, as set forth by Andrey Bakulin, Albena Mateeva, Rodney Calvert, Patsy Jorgensen in an SEG-paper entitled "Virtual Shear Checkshot with airguns", which is accessible online via http://abstracts.seg.org/techprog.cfm?CFID=44610&CFTOKEN=21528272&pLast-MeetingID=3&pMode=3&pSession=27& and by Albena Mateeva, Andrey Bakulin, Patsy Jorgensen, and Jorge L. Lopez in a paper entitled "Accurate Estimation of Subsalt Velocities Using Virtual Checkshots" published as OTC paper 17869-PP. Both papers are herein incorporated by reference.

For typical vertical velocity ratios the dependence of $f_0$ on $V_{S0}/V_{P0}$ may be approximated as $f_0 \approx 1 + (V_{S0}/V_{P0})^2$. Assuming, for instance, $V_{S0}/V_{P0}=0.5$ as used by Williamson and Maocec (cited above), $\delta$ and $\eta$ in $\delta_{VSP}$ and $\eta_{VSP}$ respectively have prefactors 0.25 and 1.5. Therefore, the $\eta$-term is considered to dominate the $\delta$-term for polarization angles of $\psi > \approx 25$ degrees from the vertical. At smaller angles, the influence of $\delta$ on $q(\psi)$ is mostly overshadowed by the vertical P-wave velocity $V_{P0}$ Thus $\delta$ is less tightly constrained than $\eta$ by the inversion.

Figure 2:
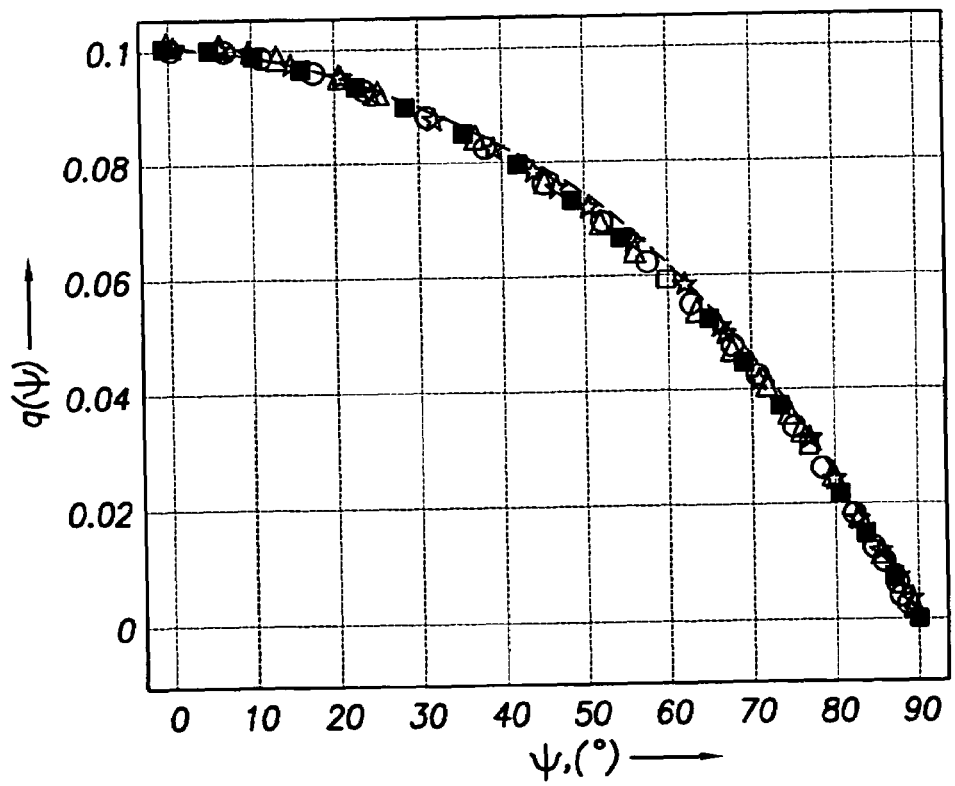
FIG. 2 a graph comparing results of slowness-polarization calculations made with and without weak anisotropy approximation.

FIG. 2 shows results of calculations of vertical P-wave slowness q against polar polarization angle $\psi$ for varying degrees of anisotropy. The calculations were performed by solving the Christoffel equation, relating polarization and slowness vectors of waves propagating in a homogeneous anisotropic medium, in the vertical transverse isotropic symmetry but without assuming weak anisotropy. Varying degrees of anisotropy have been tested (see Table 1) but constrained by the fact that each time $V_{P0}$=3 km/s (10 kft/s), $\delta_{VSP}$=0.03 and $\eta_{VSP}$=0.42.

TABLE 1 legend to FIG. 2

| symbol | $V_{S0}/V_{P0}$ | $\epsilon$ | $\delta$ | $\eta$ |
|---|---|---|---|---|
| ☆ | 0.1 | 6.40 | 3.30 | 0.41 |
| △ | 0.3 | 0.92 | 0.34 | 0.35 |
| ○ | 0.5 | 0.40 | 0.10 | 0.25 |
| ■ | 0.7 | 0.19 | 0.03 | 0.14 |

As comparison, the dashed line shows the result of a calculation based on the above-derived parameterization which was derived for the vertical transverse isotropy case under the weak anisotropy approximation, taking $V_{P0}$=3 km/s (10 kft/s), $\delta_{VSP}$=0.03 and $\eta_{VSP}$=0.42. It can be seen that not only the solid square data points (■), corresponding to the lowest anisotropy, match the dashed line quite well, but surprisingly the other data points corresponding to moderate and strong anisotropy do so, too. Thus, the new parameterization is applicable in situations of moderate and strong anisotropy.

The method as set forth above, and the parameters that it produces, may be used for improving the exploration and development of hydrocarbon fluid containing fields. In one example, the parameters may be utilized to provide information on an anisotropic velocity field, which may be used to produce seismic images that are crisper and geologically more meaningful than images created with an isotropic velocity model.

In other examples, the parameters $\delta_{VSP}$, and $\eta_{VSP}$ are useful in their own right. For instance, $\delta_{VSP}$ is responsible for describing near-vertical behavior of $q(\psi)$, while $\eta_{VSP}$ governs the vertical slowness behavior at larger angles. The parameters $\delta_{VSP}$ and $\eta_{VSP}$ may be correlated with their physical causes, including lithology, fractures, stresses, etc., which enables obtaining valuable information about these which may the localization of economically producible hydrocarbons better achievable.

Figure 3:
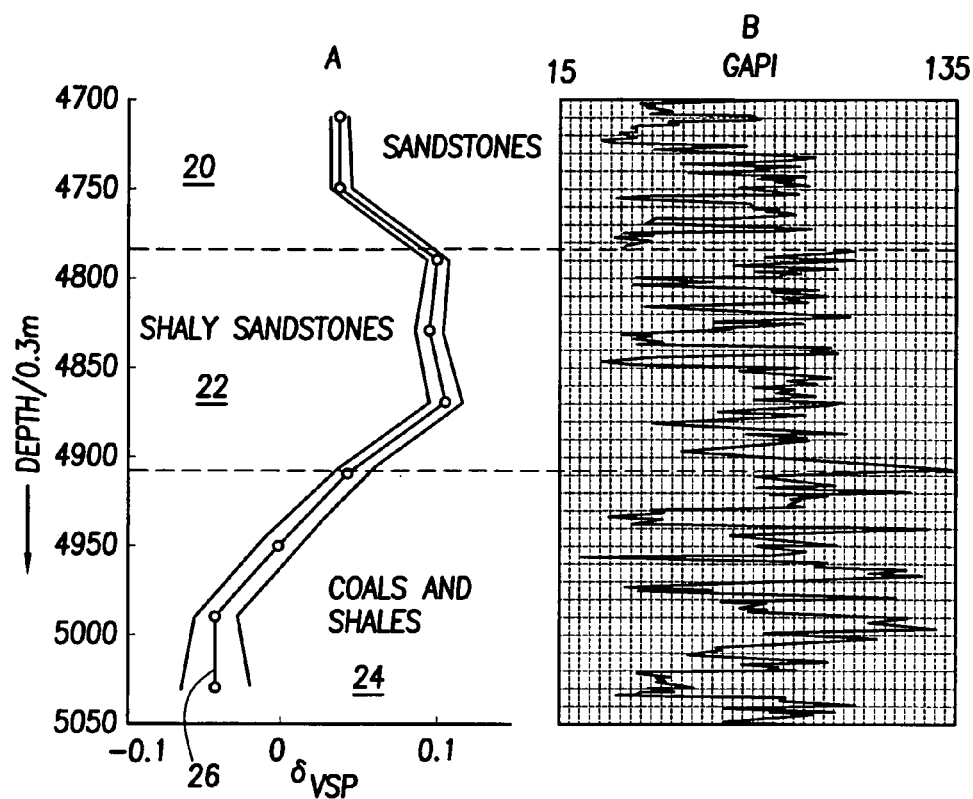
FIG. 3 shows a comparison of a graphic representation of regression values of free parameter $\delta_{VSP}$ as a function of vertical depth with a gamma ray log at Rulison.
Figure 4:
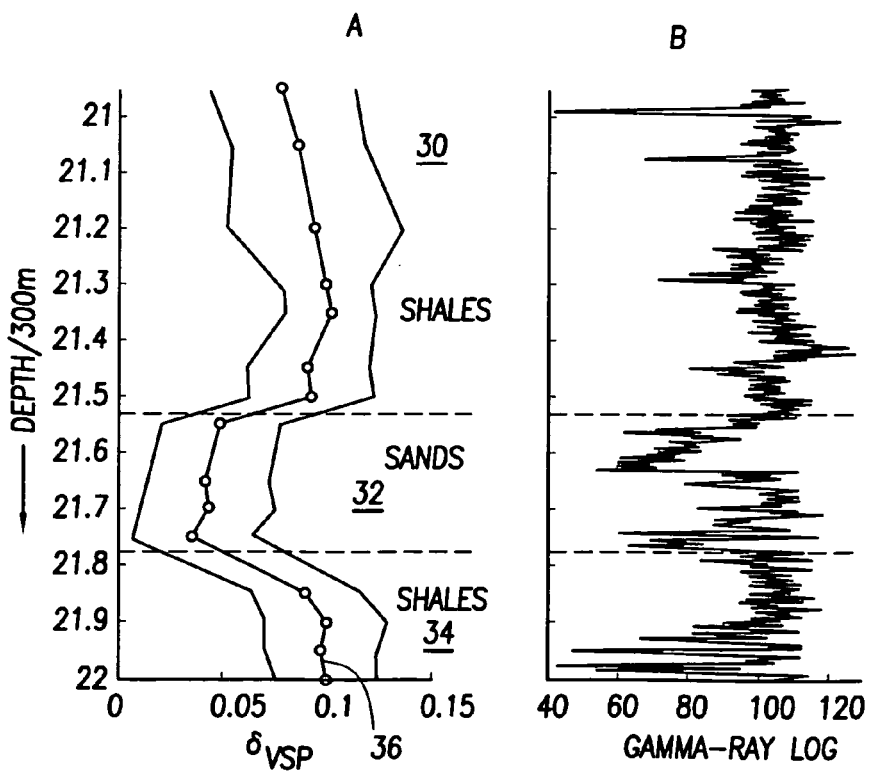
FIG. 4 shows a comparison of a graphic representation of regression values of free parameter $\delta_{VSP}$ as a function of vertical depth with a gamma ray log at Boreas.

In FIGS. 3 and 4, for example, $\delta_{VSP}$ is shown to correlate with lithology. The parameter $\delta_{VSP}$ may suitably be used to distinguish sands from shales in the subsurface For instance, in the subsurface represented in FIG. 3, three layers have been identified: a layer of sandstones 20, up to a depth of approximately 1435 m (4785 ft whereby 1 ft=0.3 m); a layer of shaly sandstones 22 between approximately 1435 m and 1470 m (4905 ft); and a layer of coals and shales beyond 1470 m. Line 26 in the left hand side of the figure (part A) represents regression values for $\delta_{VSP}$ obtained by fitting $$p_3 \equiv q(\psi) \simeq \frac{\cos\psi}{V_{P0}}(1 + \delta_{VSP}\sin^2\psi + \eta_{VSP}\sin^4\psi),$$

to P-wave slowness data using receivers at various depths (shown by open data points). The two lines on either side of line 26 represents the standard deviation in the regression values. The $\delta_{VSP}$ has a value of approximately 0.1 in layer 22 of the shaly sandstones, and significantly deviates from this value in the other layers 22 and 24. A gamma-ray log is shown in the right hand side of FIG. 3 (part B) for comparison. A qualitative correlation is found.

FIG. 4 is another example. Here, three layers have been identified: a layer of shales 30, up to a depth of approximately 6459 m (21.53 kft whereby 1 kft=300 m); a layer of sands 32 between approximately 6459 m and 6534 m (21.78 kft); and another layer of shales beyond 6534 m. Line 36 in the left hand side of the figure (part A) represents regression values for $\delta_{VSP}$ obtained by fitting the same function as in FIG. 3 to P-wave slowness data. The two lines on either side of line 36 represent the standard deviation. A gamma-ray log is shown in the right hand side of FIG. 4 (part B) for comparison. A qualitative correlation is found.

A surprising correlation is revealed, because $\delta_{VSP}$ in FIG. 4 again has a value of approximately 0.1 in the shale layers 30 and 34, similar to what was observed in FIG. 3. The sands in layer 32 also show in the $\delta_{VSP}$.

$\delta_{VSP}$ is presently thought to correlate better with lithology than Thomsen parameter $\delta$.

A lateral extrapolation of $\delta_{VSP}$ away from the well may even be made to build a 3D anisotropy model. The parameters may also be used to study stress, if the anisotropy is stress-induced or has a stress-induced component to it. Examples could include stress-induced anisotropy due to depletion and/or production from a reservoir, or due to tectonic forces for instance due to presence of a nearby salt body. The parameters $\delta_{VSP}$ and $\eta_{VSP}$ may also form the basis for time-lapse, or 4D, studies of reservoirs during production.

Hence, the methodology as set forth above may be part of a method of producing a mineral hydrocarbon containing fluid from an earth formation, wherein the regression values of the parameters from the selected function relating P-wave polarization angle to P-wave slowness are correlated with the presence and/or nature of a mineral hydrocarbon containing fluid reservoir. A wellbore may then be drilled to and into the reservoir, completed in any conventional way such that the mineral hydrocarbon containing fluid may be produced from the reservoir via the completed wellbore.

Examples of mineral hydrocarbons include oil and natural gas.

Instructions for analyzing vertical seismic profile data as set forth above, may be provided in the form of a computer readable medium storing such instructions. By way of example, and not limitation, computer readable media may comprise computer storage media and communication media. Computer storage media may include volatile and/or nonvolatile memory forms such as a read only memory (ROM) and random access memory (RAM). Volatile/nonvolatile computer storage media may be either removable or non-removable. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile is optical disk such as a CD ROM or other optical media. Other removable/non-removable, volatile/non-volatile computer storage media that can be used include, but are not limited to, magnetic tape cassettes, flash memory cards, digital versatile disks, digital video tape, solid state RAM, solid state ROM, and the like.

The invention has been described in the context of preferred and other embodiments and not every embodiment of the invention has been described. Obvious modifications and alterations to the described embodiments are available to those of ordinary skill in the art. The disclosed embodiments are not intended to limit or restrict the scope or applicability of the invention conceived of by the Applicants, but rather, in conformity with the patent laws, Applicants intend to protect all such modifications and improvements to the full extent that such falls within the scope or range of equivalent of the following claims.

The invention claimed is:

1. A method of analyzing vertical seismic profile data, the method comprising
   obtaining a multi-offset vertical seismic profiling data set comprising a representation of a wave-field recorded by an array of multi-component seismic receivers;
   extracting a P-wave slowness-polarization data set from the multi-offset vertical seismic profiling data set, the P-wave slowness-polarization data set resolving P-wave slowness against P-wave polarization angle relative to a reference direction;
   selecting a function relating P-wave polarization angle to P-wave slowness, the selected function being dependent on at least three free parameters, wherein in at least two of these free parameters information of shear wave velocity is absorbed together with one or more anisotropy parameters descriptive of formation anisotropy; and
   finding regression values for the at least three free parameters by fitting the selected function to the P-wave slowness-polarization data set;
   wherein the selected function is derived in a weak anisotropy approximation, and
   wherein the selected function is derivable from $$p_m \simeq \frac{U_m}{V_p} - \left[ \frac{U_m U_i}{2} + f(U_m^{(2)} U_i^{(2)} + U_m^{(3)} U_i^{(3)}) \right] \frac{\Delta c_{ijkl}}{V_p^3} U_j U_k U_l, \ (m = 1, 2, 3)$$

summed over all combinations of values 1, 2, and 3 for repeated indices i, j, k, and l, wherein the values 1, 2, and 3 represent three orthogonal directions, wherein
   $V_p$ represents the P-wave velocity in the reference direction;
   $p_m$ denotes P-wave slowness in direction m;
   m represents a direction index representing the three orthogonal directions;
   $U_1$, $U_2$, and $U_3$ represent components of a perturbed P-wave polarization vector U along directions 1, 2, and 3;
   $U_1^{(2)}$, $U_2^{(2)}$, $U_3^{(2)}$, $U_1^{(3)}$, $U_2^{(3)}$, $U_3^{(3)}$, represent components, along directions 1, 2, and 3, of vectors $U^{(2)}$ and $U^{(3)}$ that are orthogonal to the perturbed P-wave polarization vector U;
   $f=1/(1-(V_s/V_p)^2)$ wherein $V_s$ represents S-wave velocity in the reference direction; and
   $\Delta c_{ijkl}$ represent anisotropic perturbations from an isotropic stiffness tensor $c_{ijkl}$ of the earth formation.

2. The method of claim 1, further comprising the step of calculating values for the one or more anisotropy parameters from the regression values, by inserting the information of shear wave velocity.

3. The method of claim 2, wherein the information of shear wave velocity comprises the shear wave velocity in the reference direction.

4. The method of claim 2, wherein the information of shear wave velocity is obtained independently from the vertical seismic profiling data set.

5. The method of claim 2, wherein the information of shear wave velocity is obtained from a sonic log.

6. The method of claim 1, wherein the information of shear wave velocity in the at least two of the free parameters is expressible as $1/(1-(Vs/Vp)^2)$, wherein Vs represents shear wave velocity and Vp represents pressure wave velocity.

7. The method of claim 1, wherein the array of multi-component seismic receivers is aligned along the reference direction.

8. The method of claim 7, wherein the P-wave slowness comprises P-wave slowness in reference direction.

9. The method of claim 1, wherein one of the three free parameters is independent of formation anisotropy and shear wave information.

10. The method of claim 9, wherein the one of the three free parameters is dependent on P-wave velocity.

11. The method of claim 1, wherein the reference direction is vertical.

12. The method of claim 1, wherein the selected function takes the form of:

$$p_m \simeq \frac{U_m}{V_p} - \left[ \frac{U_m U_i}{2} + f(U_m^{(2)} U_i^{(2)} + U_m^{(3)} U_i^{(3)}) \right] \frac{\Delta c_{ijkl}}{V_p^3} U_j U_k U_l, \ (m = 1, 2, 3)$$

$$p_3 \equiv q(\psi) \simeq \frac{\cos\psi}{V_{p_0}} (1 + \delta_{VSP}\sin^2\psi + \eta_{VSP}\sin^4\psi),$$

whereby, δVSP relates to the Thomsen anisotropic parameter δ as δVSP=(f0−1)δ, and ηVSP relates to the Thomsen anisotropic parameter η as ηVSP=(2f0−1)η, and whereby f0 is defined as f0=1/(1−(Vs0/Vp0)2) wherein Vs0 and Vp0 respectively represent S-wave and P-wave velocity in the reference direction.

13. The method of claim 1, further comprising using at least one of the regression values for lithology discrimination.

14. Method of producing a mineral hydrocarbon fluid from an earth formation, comprising:
   providing regression values of parameters in a selected function relating P-wave polarization angle to P-wave slowness, wherein the regression values have resulted from analyzing a vertical seismic profile in accordance with the method set forth in claim 1;
   correlating the regression values with the presence and/or nature of a mineral hydrocarbon containing fluid reservoir;
   producing the mineral hydrocarbon containing fluid from the reservoir via a well that penetrates into the reservoir.

15. A computer readable medium storing computer-executable instructions performing at least the following steps:

receiving a multi-offset vertical seismic profiling data set comprising a representation of a wave-field recorded by an array of multi-component seismic receivers;

extracting a P-wave slowness-polarization data set from the multi-offset vertical seismic profiling data set, the P-wave slowness-polarization data set resolving P-wave slowness against P-wave polarization angle relative to a reference direction; and finding regression values for the at least three free parameters by fitting a selected function to the P-wave slowness-polarization data set, the selected function relating P-wave polarization angle to P-wave slowness and being dependent on at least three free parameters, wherein in at least two of these free parameters information of shear wave velocity is absorbed together with one or more anisotropy parameters descriptive of formation anisotropy;

wherein the selected function is derived in a weak anisotropy approximation and the the selected function is derivable from $$p_m \simeq \frac{U_m}{V_p} - \left[\frac{U_m U_i}{2} + f(U_m^{(3)}U_i^{(3)} + U_m^{(3)}U_i^{(3)})\right]\frac{\Delta c_{ijkl}}{V_p^3}U_j U_k U_l, (m = 1, 2, 3)$$

summed over all combinations of values 1, 2, and 3 for repeated indices i, j, k, and l, wherein the values 1, 2, and 3 represent three orthogonal directions, wherein $V_p$ represent the P-wave velocity in the reference direction;

$p_m$ denotes P-wave slowness in direction m;

m represents a directions index representing the three orthogonal directions;

$U_1$, $U_2$, and $U_3$ represent components of a perturbed P-wave polarization vector U along direction 1, 2, and 3;

$U_1^{(2)}$, $U_2^{(2)}$, $U_3^{(2)}$, $U_1^{(3)}$, $U_2^{(3)}$, $U_3^{(3)}$, represent components, along directions 1, 2, and 3, of vectors $U^{(2)}$ and $U^{(3)}$ that are orthogonal to the perturbed P-wave polarization vector U;

$f=1/(1-(V_s/V_p)^2)$ wherein $V_s$ represent S-wave velocity in the reference direction; and $\Delta c_{ijkl}$ represent anisotropic perturbations from an isotropic stiffness tensor $c_{ijkl}$ of the earth formation.

16. The computer readable medium of claim 15, further storing computer-executable instructions to insert the information of shear wave velocity into the found regression values and thereby calculate values for the one or more anisotropy parameters from the regression values.

17. The computer readable medium of claim 15, wherein the selected function takes the form of:

$$p_3 \equiv q(\psi) \simeq \frac{\cos\psi}{V_{p_0}}(1 + \delta_{VSP}\sin^2\psi + \eta_{VSP}\sin^4\psi),$$

whereby, $\delta_{VSP}$ relates to the Thomsen anisotropic parameter $\delta$ as $\delta_{VSP}=(f_0-1)\delta$, and $\eta_{VSP}$ relates to the Thomsen anisotropic parameter $\eta$ as $\eta_{VSP}=(2f_0-1)\eta$, and whereby $f_0$ is defined as $f_0=1/(1-(V_{s0}/V_{p0})^2)$ wherein $V_{s0}$ and $V_{p0}$ respectively represent S-wave and P-wave velocity in the reference direction.

18. The computer readable medium of claim 15, further storing at least a computer-executable instruction that uses at least one of the regression values for lithology discrimination.

* * * * *